US011395363B2

(12) United States Patent
Cheng et al.

(10) Patent No.: US 11,395,363 B2
(45) Date of Patent: Jul. 19, 2022

(54) METHOD OF PROCESSING UE IDLE STATE WITH SEPARATED MM FUNCTION ENTITY AND SM FUNCTION ENTITY, MOBILITY MANAGEMENT FUNCTION ENTITY, AND SESSION MANAGEMENT FUNCTION ENTITY

(71) Applicant: CHINA ACADEMY OF TELECOMMUNICATIONS TECHNOLOGY, Beijing (CN)

(72) Inventors: Zhimi Cheng, Beijing (CN); Weiqi Hu, Beijing (CN); Hui Xu, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 338 days.

(21) Appl. No.: 16/476,808

(22) PCT Filed: Feb. 8, 2018

(86) PCT No.: PCT/CN2018/075809
§ 371 (c)(1),
(2) Date: Jul. 9, 2019

(87) PCT Pub. No.: WO2018/127235
PCT Pub. Date: Jul. 12, 2018

(65) Prior Publication Data
US 2019/0380167 A1    Dec. 12, 2019

(30) Foreign Application Priority Data
Jan. 9, 2017    (CN) .......................... 201710013375.5

(51) Int. Cl.
*H04W 76/30* (2018.01)
*H04W 76/11* (2018.01)
(Continued)

(52) U.S. Cl.
CPC ............. *H04W 76/30* (2018.02); *H04W 8/08* (2013.01); *H04W 76/11* (2018.02); *H04W 80/10* (2013.01)

(58) Field of Classification Search
CPC ....... H04W 76/30; H04W 76/11; H04W 8/08; H04W 80/10; H04W 76/34; H04W 76/15; H04W 76/22
See application file for complete search history.

(56) References Cited

U.S. PATENT DOCUMENTS 7,760,628 B2 * 7/2010 Suszko ................. H04L 67/141
370/230
10,667,185 B2 * 5/2020 da Silva ............ H04W 36/0069
(Continued)

FOREIGN PATENT DOCUMENTS

| CN | 1949924 A | 4/2007 |
| CN | 102026408 A | 4/2011 |
| CN | 105813079 A | 7/2016 |

OTHER PUBLICATIONS

First Office Action from CN app. No. 201710013375.5, dated Dec. 24, 2018, with English translation from Global Dossier.
(Continued)

*Primary Examiner* — Mounir Moutaouakil
(74) *Attorney, Agent, or Firm* — Ladas & Parry, LLP

(57) ABSTRACT

The present disclosure provides a method of processing UE idle state, a mobility management (MM) entity, and a session management (SM) function entity. The method includes: receiving, by the mobility management MM function entity, a connection release request sent by an access network entity, wherein the connection release request carries identifier information of the UE; and sending, by the MM function entity, a user plane connection deactivation request to the SM function entity according to the connection release request, the user plane connection deactivation request is
(Continued)

receiving, by a mobility management (MM) function entity, a connection release request sent by the access network entity, wherein the connection release request carries an identifier of the UE or a context identifier of the UE — 101 sending, by the MM function entity, a user plane connection deactivation request to the SM function entity according to the connection release request, the user plane connection deactivation request is used to request the SM function entity to delete a user plane connection of the UE, and maintain a signaling plane connection of the UE — 102 used to request the SM function entity to delete the user plane connection of the UE, and maintain the signaling plane connection of the UE. In this way, after the UE is in an idle state, the user plane between the UE and the core network is not maintained, but the signaling plane remains.

16 Claims, 10 Drawing Sheets

(51) Int. Cl.
*H04W 8/08* (2009.01)
*H04W 80/10* (2009.01)

(56) References Cited

U.S. PATENT DOCUMENTS

| | | | | |
|---|---|---|---|---|
| 2008/0075048 | A1* | 3/2008 | Suszko | H04L 67/04 370/338 |
| 2013/0039287 | A1* | 2/2013 | Rayavarapu | H04W 72/042 370/329 |
| 2014/0293796 | A1* | 10/2014 | Jeong | H04M 15/66 370/236 |
| 2014/0334427 | A1 | 11/2014 | Sun | |
| 2015/0245402 | A1* | 8/2015 | Mochizuki | H04W 76/15 370/331 |
| 2015/0312826 | A1* | 10/2015 | Yiu | H04W 48/16 455/437 |
| 2018/0310359 | A1* | 10/2018 | Takahashi | H04W 74/0833 |
| 2019/0104455 | A1* | 4/2019 | Park | H04W 36/0022 |
| 2019/0104563 | A1* | 4/2019 | Olsson | H04W 76/38 |
| 2019/0116519 | A1* | 4/2019 | Park | H04W 28/12 |
| 2019/0246318 | A1* | 8/2019 | Kim | H04W 36/0055 |
| 2020/0100088 | A1* | 3/2020 | Kim | H04W 88/04 |

OTHER PUBLICATIONS

Written Opinion of the International Searching Authority and International Search Report from PCT/CN2018/075809, dated Apr. 16, 2018, with English translation from WIPO.

International Preliminary Report on Patentability from PCT/CN2018/075809, dated Jul. 9, 2019, with English translation from WIPO.

"Control plane interface for MM and SM support (update of solution 1.3)", S2-162629, SA WG2 Meeting #115, May 23-27, Nanjing, P.R. China.

"SM and MM decoupling", S2-165642, 3GPP TSG SA WG2 Meeting #117, Oct. 17-21, 2016, Kaohsiung City, Taiwan.

"3$^{rd}$ Generation Partnership Project; Technical Specification Group Services and System Aspects; Study on Architecture for Next Generation System (Release 14)", 3GPP TR 23.799, v14.0.0 (Dec. 2016).

* cited by examiner

```
receiving, by a mobility management (MM) function entity, a connection
release request sent by the access network entity, wherein the connection     101
release request carries an identifier of the UE or a context identifier of
                              the UE
```

```
sending, by the MM function entity, a user plane connection deactivation
   request to the SM function entity according to the connection release      102
request, the user plane connection deactivation request is used to request
  the SM function entity to delete a user plane connection of the UE, and
          maintain a signaling plane connection of the UE
```

Fig. 1

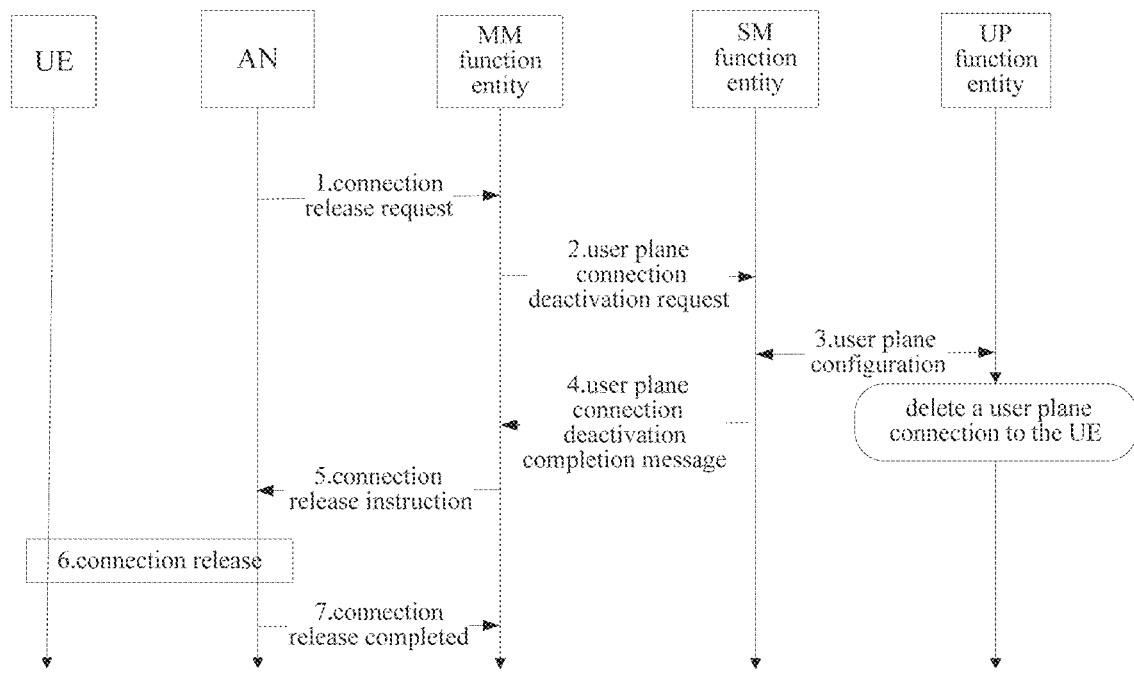

Fig. 2

METHOD OF PROCESSING UE IDLE STATE WITH SEPARATED MM FUNCTION ENTITY AND SM FUNCTION ENTITY, MOBILITY MANAGEMENT FUNCTION ENTITY, AND SESSION MANAGEMENT FUNCTION ENTITY

CROSS-REFERENCE TO RELATED APPLICATION

This application is the U.S. national phase of PCT Application No. PCT/CN2018/075809 filed on Feb. 8, 2018, which claims a priority to the Chinese patent application No. 201710013375.5 filed on Jan. 9, 2017, the disclosures of which are incorporated herein by reference in their entireties.

TECHNICAL FIELD

The present disclosure relates to the field of communication technology, and in particular, to a method of switching user equipment (UE) state, a mobility management (MM) function entity, and a session management function entity.

BACKGROUND

In related art, when the UE is in an inactive state, it enters an idle state; when the UE or the network needs to transmit data, the UE needs to be triggered to enter a connected state from the idle state. With continuous development of mobile communication technology, future mobile communication network may support separated controlling and forwarding of a gateway, and a MM function is separated from a SM function. However, for a case where the MM function is separated from the SM function, there is no method for implementing UE state switching in the related art.

SUMMARY

The present disclosure provides a UE idle state processing method, a MM function entity, and a SM function entity to implement a UE state switching method for a case where a MM function entity is separated from a SM function entity.

In order to achieve e above object, an embodiment of the present disclosure provides a user terminal UE idle state processing method, the method includes:

a mobility management MM function entity receives a connection release request sent by an access network entity, where the connection release request carries identity information of the UE;

the MM function entity sends a user plane connection deactivation request to the SM function entity according to the connection release request, the user plane connection deactivation request is used to request the SM function entity to delete the user plane connection of the UE, and keep a signaling plane of the UE to be connected.

Optionally, the method further includes:

the MM function entity receives a user plane connection deactivation completion message sent by the SM function entity;

the MM function entity sends a connection release instruction to the access network entity according to the user plane connection deactivation completion message, the connection release instruction is used to instruct the access network entity to release a signaling plane connection and a user plane connection between the access network entity and the UE, and UE context information.

Optionally, the method further includes:

the MM function entity receives a service request message sent by the access network entity, where the service request message carries identity information of the UE;

the MM function entity sends a connection establishment request message to the access network entity according to the service request message, where the connection establishment request message is used to instruct the access network entity to establish a signaling plane connection and a user plane connection between the access network entity and the UE, and UE context information.

Optionally, the method further includes:

the MM function entity receives a connection establishment completion message sent by the access network entity;

the MM function entity sends a user plane connection activation request to the SM function entity according to the connection establishment completion message, the user plane connection activation request message is used to request the SM function entity to create a user plane connection of the UE.

Optionally, the method further includes:

the MM function entity receives downlink data packet report (DDN) sent by the SM function entity, the DDN carries identifier information of a target UE;

The MM function entity pages the target UE according to the DIN.

An embodiment of the present disclosure further provides a user terminal UE idle state processing method, the method includes:

a session management function entity receives a user plane connection deactivation request sent by a mobility management (MM) function entity, wherein the user plane connection deactivation request carries identity information of UE;

the SM function entity deletes a user plane connection of the UE according to the user plane connection deactivation request, and maintains a signaling plane of the UE to be connected.

Optionally, the SM function entity deletes the user plane connection of the UE according to the user plane connection deactivation request, including:

The SM function entity sends a first user plane configuration instruction to the user plane (UP) function entity that serves the UE according to the user plane connection deactivation request, the first user plane configuration instruction is used to instruct that the UP function entity that serves the UE modifies the user plane configuration of the UE.

Optionally, the method further includes:

the SM function entity receives a user plane configuration completion message sent by the UP function entity;

the SM function entity sends a user plane connection deactivation completion message to the MM function entity according to the user plane configuration completion message.

Optionally, the UP function entity that serves the UE includes at least an access network (AN) side UP function entity and a data network (DN) side UP function entity, the first user plane configuration instruction is used to instruct the DN side UP function entity to modify the user plane of the UE, and is used to instruct that a UP function entity other than the DN side UP function entity on the UE user plane connection to delete the user plane connection with the UE.

Optionally, the method further includes:

the SM function entity receives a user plane connection activation request sent by the MM function entity;

the SM function entity selects a target UP function entity for the UE according to the user plane connection activation request and session related information, wherein the target UP function entity is an UP function entity other than the DN side UP function entity;

the SM function entity sends a second user plane configuration instruction to the target UP function entity, the second user plane configuration instruction is used to instruct that the target UP function entity establishes a user plane connection with the UE, and is used to instruct the DN side UP function entity to modify the user plane of the UE.

Optionally, the session related information includes at least one of the following:

location information of the UE, service demand, node load, and congestion degree of a link.

Optionally, the method further includes:

the SM function entity receives data packet identifier information sent by the DN side UP function entity;

The SM function entity searches for session information related to the target UE in the stored UE context according to the data packet identifier information;

If the session information related to the target UE is found, the SM function entity sends a downlink data packet report (DDN) to the MM function entity, where the DDN is used to instruct the MM function entity to page the target UE;

If the session information related to the target UE is not found, e SM function entity sends a third user plane configuration instruction to the DN side UP function entity, the third user plane configuration instruction is used to instruct the DN side UP function entity to discard data packet corresponding to the data packet identifier information.

An embodiment of the present disclosure further provides a mobility management (MM) function entity, the MM function entity includes:

a first receiving module, configured to receive a connection release request sent by an access network entity, wherein the connection release request carries identifier information of the user terminal (UE);

a first sending module, configured to send a user plane connection deactivation request to the SM function entity according to the connection release request, the user plane connection deactivation request is used to request the SM function entity to delete a user plane connection of the UE, and maintain a signaling plane of the UE to be connected.

Optionally, the MM function entity further includes:

a second receiving module, configured to receive a user plane connection deactivation completion message sent by the SM function entity;

a second sending module, configured to send a connection release instruction to the access network entity according to the user plane connection deactivation completion message, the connection release instruction is used to instruct the access network entity to release a signaling plane connection and a user plane connection between the access network entity and the UE, and UE context information.

Optionally, the MM function entity further includes:

a third receiving module, configured to receive a service request message sent by the access network entity, wherein the service request message carries identifier information of the UE:

a third sending module, configured to send, according to the service request message, a connection establishment request message access network entity, the connection establishment request message is used to instruct the access network entity to establish a signaling plane connection and user plane connection between the access network entity and the UE, and UE context information.

Optionally, the MM function entity further includes:

a fourth receiving module, configured to receive a connection establishment completion message sent by the access network entity;

a fourth sending module, configured to send a user plane connection activation request to the SM function entity according to the connection establishment completion message, the user plane connection activation request s used to request the SM function entity to create and a user plane connection between a user plane UP function entity and the UE.

Optionally, the MM function entity further includes:

a fifth receiving module, configured to receive a downlink data packet report (DDN) sent by the SM function entity, wherein the DDN carries identifier information of the target UE;

a paging module, configured to page the target UE according to the DDN.

An embodiment of the present disclosure further provides a session management SM function entity, wherein the SM function entity includes:

a first receiving module, configured to receive a user plane connection deactivation request sent by the mobility management MM function entity, wherein the user plane connection deactivation request carries the identifier information of the UE;

a deleting module, configured to delete a user plane connection of the UE according to the user plane connection deactivation request, and maintain a signaling plane connection of the UE.

Optionally, the deleting module, is configured to sending, according to the user plane connection deactivation request, the first user plane configuration instruction to the user plane UP function entity that serves the UE, the first user plane configuration instruction is used to instruct that the UP function entity that serves the UE modify a user plane configuration of the UE.

Optionally, the SM function entity further includes:

a second receiving module, configured to receive a user plane configuration completion message sent by the UP function entity;

a first sending module is configured to send a user plane connection deactivation completion message to the MM function entity according to the user plane configuration completion message.

Optionally, the UP function entity that serves the UE includes at least an access network (AN) side UP function entity and a data network (DN) side UP function entity, the first user plane configuration instruction is used to instruct the DN side UP function entity to modify the user plane of the UE, and is used to instruct that the UP function entity other than the DN side UP function entity on the UE user plane connection deletes a user plane connection with the UE.

Optionally, the SM function entity further includes:

a third receiving module, configured to receive a user plane connection activation request sent by the MM function entity;

a selection module, configured to select a target UP function entity for the UE according to the user plane connection activation request and session related information, wherein the target UP function entity is an UP function entity other than the DN side UP function entity;

a second sending module, configured to send a second user plane configuration instruction to the target UP function entity, where the second user plane configuration instruction is used to instruct that the target UP function entity establishes a user plane connection with the UE, and configured to instruct the DN side UP function entity to modify a user plane of the UE.

Optionally, the session related information includes at least one of the following:

Location information of the UE, service demand, node load, and congestion degree of the link.

Optionally, the SM function entity further includes:

a fourth receiving module, configured to receive data packet identifier information sent by the DN side UP function entity;

a searching module, configured to search, according to the data packet identifier information, the session information related to the target UE from the UE context;

a third sending module, configured to send a downlink data packet report DDN to the MM function entity, where the DDN is used to instruct the MM function entity to page the target UE;

a fourth sending module, configured to send a third user plane configuration instruction to the DN side UP function entity, if the session information related to the target UE is not found, the third user plane configuration instruction is used to instruct the DN side UP function entity to discard the data packet corresponding to the data packet identifier.

In an embodiment of the present disclosure, the mobility management MM function entity receives the connection release request sent by the access network entity, wherein the connection release request carries identifier information of the UE; the MM function entity sends a user plane connection deactivation request to the SM function entity according to the connection release request, the user plane connection deactivation request is used to request the SM function entity to delete the user plane connection of the UE, and maintain a signaling plane connection of the UE. In this way, after the UE is in an idle state, the user plane between the UE and a core network is not maintained, but the signaling plane remains.

BRIEF DESCRIPTION OF THE DRAWINGS

In order to more clearly illustrate the technical solutions of the embodiments of the present disclosure, the drawings used in the description of the embodiments of the present disclosure will be briefly described. It obvious that the drawings in the following description are only some embodiments of the present disclosure. Other drawings may also be obtained from those of ordinary skill in the art in view of the drawings.

FIG. 1 is a schematic flowchart of a UE idle state processing method according to an embodiment of the present disclosure;

FIG. 2 is a schematic diagram of data transmission provided by an embodiment of the present disclosure;

DETAILED DESCRIPTION OF THE EMBODIMENTS

Figure 3:
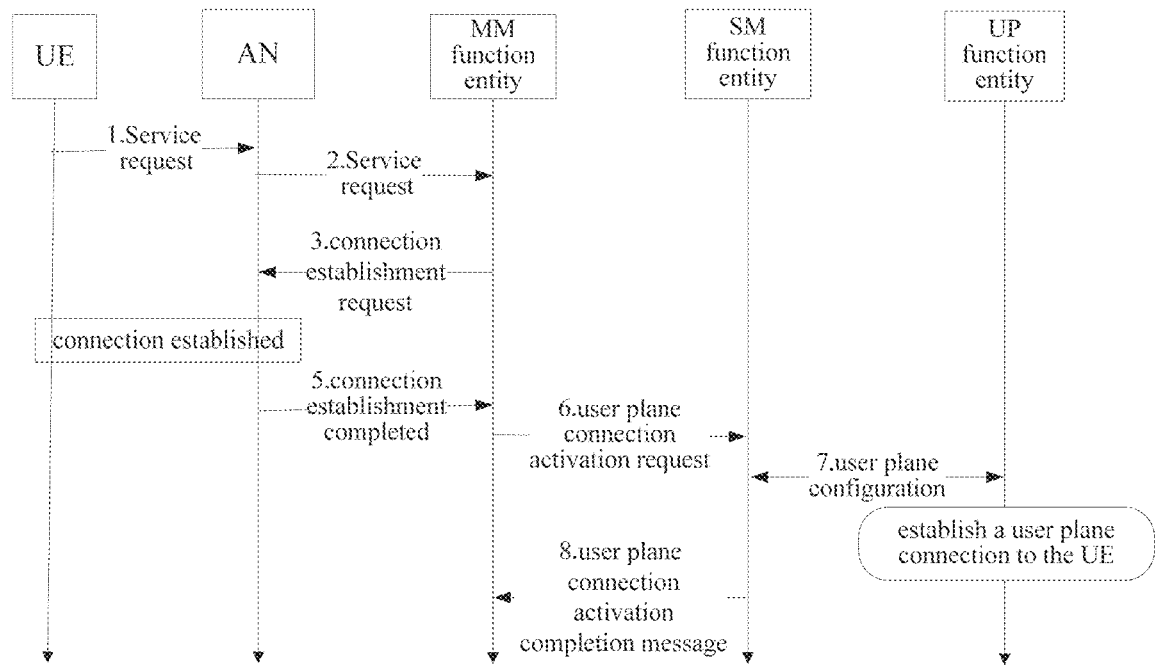
FIG. 3 is another schematic diagram of data transmission provided by an embodiment of the present disclosure.

A technical problem to be solved, technical solutions, and the advantages of the present invention will be more clearly described in conjunction with the accompanying drawings and specific embodiments.

Separation of controlling and forwarding means that the controlling and forwarding functions of a mobile network are logically divided, and different logical network elements are responsible for corresponding functions, thereby realizing centralized function control, resource elastic deployment, flexible service deployment, and control plane and user plane can be evolved separately. The control function is undertaken by a centralized controller to implement functions such as policy control, traffic scheduling, connection management, and mobility management. A wide variety of applications can define network routing and transport rule policies based on business characteristics without relying on the resources, performance, and other constraints of the underlying forwarding device, shielding the differences from underlying network devices, making them more flexible, intelligent, and adaptable. The user plane after the separation can be distributed and deployed according to the service requirements, and various processing and forwarding actions including routing, modification, statistics, and the like of the user packets are efficiently performed according to the instructions of the control plane, and are simple, efficient, and stable.

Introducing new features into existing networks often requires defining new functional entities and defining interfaces between new functional entities and existing functional entities. With continuous introduction of new features, the number of functional entities and interfaces in the carrier network is increasing. By analyzing the functions of the existing network elements, it can be found that the functions of these network elements are often overlapped (for example, IP (Internet Protocol), packet processing, load balancing), and similar or similar functions exist in the business process. In order to reduce the number of network elements and interfaces in the carrier network and make the network more concise and efficient, the control plane function reconstruction technology splits the control logic of the existing network into independent functional modules, and then combines according to different application scenarios to form different Network control surface.

In an Evolved Packet System (EPS), the Mobility Management Entity (MME) supports both a MM function and a SM function. For example, the MM function includes attachment, tracking area update, and the SM function includes establishment, modification, and deletion of connection for a public data network. Both a MM message and a SM message sent by the UE are terminated at the MME and processed by the MME.

In order to improve modularity of the network, in a next generation (for example, 5G) network, the MM function entity and the SM function entity may exist as two independent functional modules. The main functions of the MM function entity include user registration, UE unreachable discovery, location registration, UE state transition, connection state and inactive mobility, UE mobility restriction, UE mobility management control, and anchor point selection, user plane path creation, and the like. The main functions of the SM function entity include data packet forwarding and detection, session control, user plane function selection, UE IP address allocation (connection type is IP), and the like. The MM function entity and the SM function entity need signaling interaction with each other to implement information interaction and cooperation.

Based on the foregoing application environment, the present disclosure provides a UE idle state processing method. The UE state switching method of the present disclosure will be described in detail below in conjunction with specific embodiments. The UE described in the present disclosure may be, for example, a mobile phone, a computer, a home appliance, a tablet personal computer, a laptop computer, a personal digital assistant (PDA), a mobile internet device (MID) or a terminal device such as a wearable device. It should be noted that the specific type of the UE is not limited in the embodiments of the present disclosure.

The MM function entity and the SM function entity described in the present disclosure may be centralized on the same physical device, or may be distributed on different physical devices, and the disclosure does not specifically limit this.

Referring to FIG. 1, FIG. 1 is a schematic flowchart of a UE, idle state processing method according to an embodiment of the present disclosure. As shown in FIG. 1, the method includes the following steps:

Step 101: the mobility management MM function entity receives a connection release request sent by the access network entity, wherein the connection release request carries identifier information of the UE.

Step 102: the MM function entity sends a user plane connection deactivation request to the SM function entity according to the connection release request, the user plane connection deactivation request is used to request the SM function entity to delete the user plane connection of the UE, and maintain a signaling plane connection of the UE.

In this embodiment, after the MM function entity receives the connection release request sent by the access network entity, the MM function entity sends a user plane connection deactivation request to the SM function entity according to the connection release request. The user plane connection deactivation request is used to request the SM function entity to delete the user plane connection of the UE, and maintain the signaling plane connection of the UE. In this way, after the UE is in an idle state, the user plane between the UE and the core network is not maintained, but the signaling plane is still maintained, and the UP resource can be effectively saved.

Specifically, when the access network entity determines that the connection of the UE needs to be released (for example, when a duration of the UE without service requirement exceeds a preset time), the access network entity sends the connection release request to the MM function entity, wherein the connection release request carries at least identifier information of the UE, such as an identifier (User ID) of the UE and a context identifier (MM context ID) of the MM. It can be understood that the connection release request may further include other information, such as an identifier (eNodeB ID) of the access network entity, a reason for releasing the UE (such as user inactivity), or other identifier code.

After the MM function entity receives the connection release request, the MM function entity generates a user plane connection deactivation request according to the connection release request, and sends the user plane connection deactivation request to the SM function entity. In an embodiment of the present disclosure, the user plane connection deactivation request carries the identifier information of the UE. In other embodiments of the disclosure, the user plane connection deactivation request may further carry other information, such as reason for release, etc.

After receiving the user plane connection deactivation request, the SM function entity deletes the user plane connection of the UE according to the user plane connection deactivation request, and maintains the signaling plane connection of the UE. In some embodiments of the present disclosure, after receiving the user plane connection deactivation request, the SM function entity generates a first user plane configuration instruction according to the user plane connection deactivation request, and sends it to a user plane UP function entity that serves the UE. The first user plane configuration instruction is used to instruct the UP function entity to delete the user plane connection of the UE. That is, when the UP function entity receives the first user plane configuration instruction, the UP function entity deletes a user plane connection with the UE according to the first user plane configuration instruction.

It should be noted that, in some embodiments of the present disclosure, the UP function entity that serves the UE includes at least an access network (AN) side UP function entity and a Data Network (DN) side UP function entity. In this embodiment, the first user configuration instruction is used to instruct that the AN side UP function entity deletes a user plane connection with the UE, and is used to instruct the DN side UP function entity to modify a user plane connection of the UE, for example, instructing the DN side UP function entity to delete the connection with the AN side UP function entity, and after the downlink data packet is received, directly reporting the data packet to the SM function entity instead of being sent to the AN side UP function entity. It is to be understood that the UP function entity that serves the UE may further include an UP function entity in the core network, which is not particularly limited herein.

Referring to FIG. 2, FIG. 2 is a schematic diagram of data transmission according to an embodiment of the present disclosure. As shown in FIG. 2, in an embodiment of the present disclosure, after the user plane configuration is modified, the UP function entity that serves the UE may send the user plane configuration completion message to the SM function entity, and after the SM function entity receives the user plane configuration completion message, that is, after determining that the user plane connection of the UE is deleted, the SM function entity sends the user plane connection deactivation completion message to the MM function entity, to notify the MM function entity that the user plane connection of the UE has been deleted.

After receiving the user plane connection deactivation completion message sent by the SM, the MM function entity generates a connection release instruction according to the user plane connection deactivation completion message, and sends the connection release instruction to the access network entity. After receiving the connection release instruction, the access network entity releases a signaling plane connection and a user plane connection between the access network entity and the UE, and UE context information according to the connection release instruction. The access network entity sends a release completion message to the MM function entity after releasing the signaling plane connection and the user plane connection between the access network entity and the UE, and the UE context information, to notify the MM function entity that the access has been released, and at the same time, the access network entity may send a notification message to notify the UE that the UE has completed the release, or may not notify the UE by sending a notification message, which is not particularly limited in this disclosure.

Optionally, the method further includes:

The MM function entity receives a user plane connection deactivation completion message sent by the SM function entity;

The MM function entity sends a connection release instruction to the access network entity according to the user plane connection deactivation completion message, the connection release instruction is used to instruct the access network entity to release a signaling plane connection and a user plane connection between the access network entity and the UE, and UE context information.

In this embodiment, the SM function entity sends a user plane connection deactivation completion message to the MM function entity after deleting the user plane connection of the UE, to notify the MM function entity that the user plane connection of the UE has been deleted. After receiving the user plane connection deactivation completion message, the MM function entity generates a connection release instruction according to the user plane connection deactivation completion message, and sends the connection release instruction to the access network entity, the connection release instruction is used to instruct the access network entity to release a signaling plane connection and a user plane connection between the access network entity and the UE, and UE context information. That is, in this embodiment, after receiving the connection release command, the access network entity releases a signaling plane connection, a user plane connection, and UE context information.

Optionally, the method further includes:

The MM function entity receives a service request message sent by the access network entity, wherein the service request message carries identity information of the UE;

The MM function entity sends a connection establishment request message to the access network entity according to the service request message, the connection establishment request message is used to instruct the access network entity to establish a signaling plane connections and a user plane connection between the access network entity and the UE, and UE context information.

In this embodiment, when the UE is in an idle state, that is, after the UP function entity releases the user plane connection with the UE, and when the UE needs to perform uplink data transmission, the UE sends a service request message to the access network entity, the service request message carries at least identifier information of the UE, as shown in FIG. 3, after the access network entity receives the service request message, the service request message is forwarded to the MM function entity, it can be understood that the service request message may further carry the identifier of the access network entity. After receiving the service request message, the MM function entity sends a connection establishment request message to the access network entity, the connection establishment request message is used to instruct the access network entity to establish a signaling plane connection and a user plane connection between the access network entity and the UE, and UE context information. That is, after receiving the connection establishment request message sent by the MM function entity, the access network entity may establish a signaling plane connection, a user plane connection, and a context between the access network entity and the UE. In an embodiment of the present disclosure, the access network entity performs a connection establishment program to establish a signaling plane connection and a user plane connection between the access network entity and the UE, and UE context information.

Optionally, the method further includes:

The MM function entity receives a connection establishment completion message sent by the access network entity;

The MM function entity sends a user plane connection activation request to the SM function entity according to the connection establishment completion message, the user plane connection activation request message is used to request the SM function entity to create a user plane connection between a user plane UP function entity and the UE.

In this embodiment, the access network entity sends a connection establishment completion message to the MM function entity after completing the signaling plane connection, the user plane connection, and the context information with the UE, to notify the MM function entity that a connection between the access network entity and the UE has been established. The MM function entity receives a connection establishment completion message sent by the access network entity, and then generates a user plane connection activation request according to the connection establishment completion message, and sends the user plane connection activation request to the SM function entity in order to request the SM function entity to establish a user plane connection between the UP function entity and the UE.

In some embodiments of the present disclosure, after receiving the user plane connection activation request, the SM function entity selects a target UP function entity for the UE according to the user plane connection activation request and session related information, wherein the target UP function entity is a UP function entity other than the DN side UP function entity then sends a second user plane configuration instruction to the target UP function entity, the second user plane configuration instruction is used to instruct the target UP function entity to establish a user plane connection with the UE, and is used to instruct the DN side UP function entity to modify the user plane of the UE. In this embodiment, the session related information may be one or more of location information, service requirements, node load, and congestion degree of the UE, that is, the SM function entity selects a target UP function entity for the UE according to the above one or more, and then generates a second user plane configuration instruction and sends the second user plane configuration instruction to the target UP function entity, indicating that the target UP function entity to establish a data transmission channel, and perform a configuration of a data routing rule or a forwarding rule, and instruct the DN side UP function entity to modify a user plane of the UE. It can be understood that the target UP function entity selected by the SM function entity for the UE is an AN side UP function entity. In this way, upon receiving a service request, the SM function entity reselects the UP function entity for the UE, and can quickly select a optimized UP function entity for the UE according to the service request to meet the requirement and save cache resource of the node. At the same time, it can effectively avoid triangle routing, data packet loss etc., and improve data transmission efficiency.

In addition, in some embodiments of the present disclosure, the SM function entity may further send the second user plane configuration instruction to the DN side UP function entity, the second user plane configuration instruction is further used to instruct the DN side UP function entity to modify the user plane configuration, for example, establishing a communication connection between the DN side UP function entity and the target UP function entity, and when the DN side UP function entity receives the downlink data transmitted by the network, the DN side UP function entity forwards the downlink data to the target UP function entity, and then performs the next data forwarding by the target UP function entity.

Optionally, the method further includes:

The MM function entity receives the downlink data packet report DDN sent by the SM function entity, wherein the DDN carries identifier information of the target UE;

The MM function entity pages the target UE according to the DDN.

Figure 4:
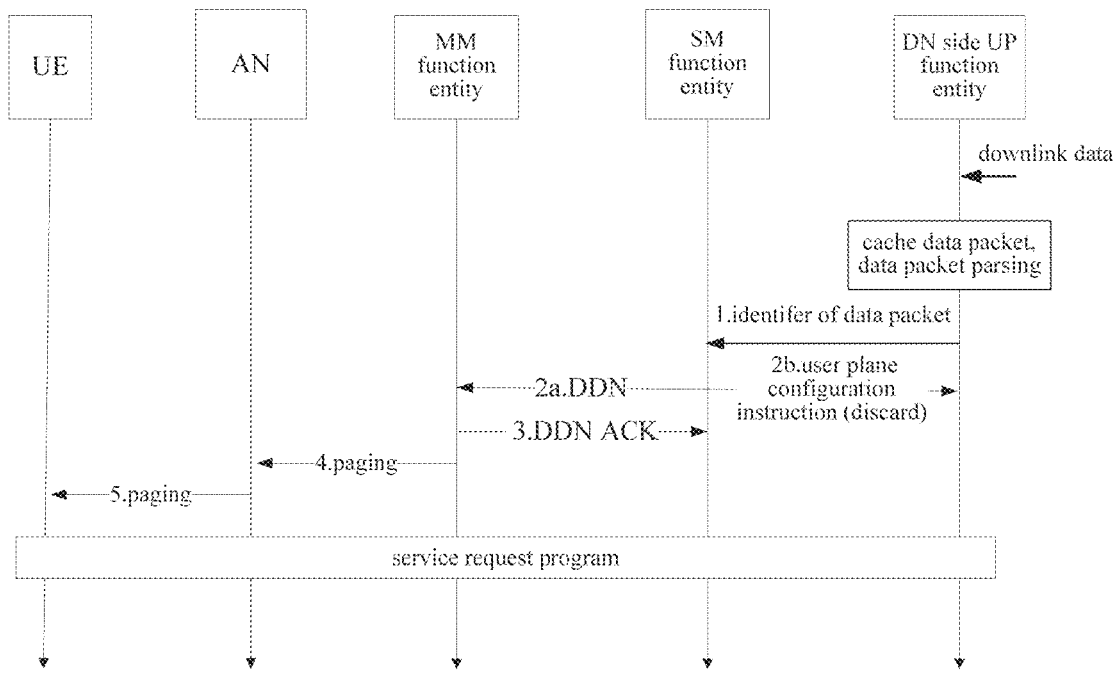
FIG. 4 is another schematic diagram of data transmission provided by an embodiment of the present disclosure.

Referring to FIG. 4, FIG. 4 is a schematic diagram of another data transmission according to an embodiment of the present disclosure. As shown in FIG. 4, in this embodiment, when the UE is in an idle state, that is, a state that the DN side UP function entity does not connect with AN side UP function entity, when the DN side UP function entity receives the downlink data packet sent by the network, the N side UP function entity caches the data packet and performs data packet parsing, and then sends data packet identifier information SM function entity, the data packet identifier information includes at least identifier information for determining a target UE to which the downlink data packet is to be sent, such as a destination IP address, an identifier of the target UE, and the like. After receiving the data packet identifier information, the SM function entity searches for the session information related to the target UE from the UE context according to the data packet identifier information.

If the session information related to the target UE is found, the SM function entity sends a Down Data Notification (DDN) to the MM function entity. The MM function entity receives the DDN, then pages the target UE according to the DDN, and then instructs the access network entity to establish a connection with the target UE.

If the session information related to the target UE is not found, the SM function entity sends a third user plane configuration instruction to the DN side UP function entity, the third user plane configuration instruction is used to instruct the DN side UP function entity to discard the data packet corresponding to the data packet identifier. That is, the downlink data packet is discarded after the DN side UP function entity receives the third user plane configuration instruction.

Figure 5:
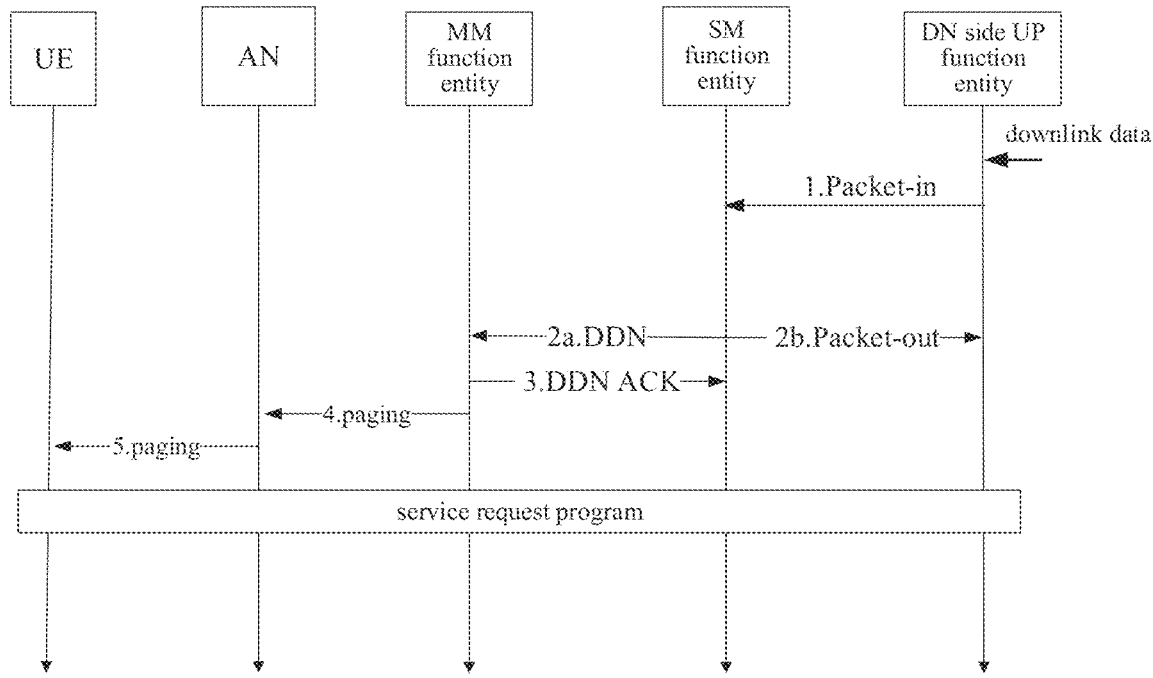
FIG. 5 is another schematic diagram of data transmission according to an embodiment of the present disclosure; FIG.

In an embodiment of the present disclosure, the downlink data may be data that is transmitted based on a Software Defined Network (SDN), that is, data that is transmitted by using an OpenFlow protocol. As shown in FIG. 5, FIG. 5 is another schematic diagram of data transmission according to an embodiment of the present disclosure. As shown in FIG. 5, the DN side UP function entity caches the downlink data packet, and sends the data packet identifier corresponding to the downlink data packet to the SM function entity as a Packet-in message. In this embodiment, the DN side UP function entity may send the data packet identifier in the Packet-in message, or may simultaneously send the data packet identifier and the downlink data packet. It should be noted that, after receiving the data packet identifier in the Packet-in message, the SM function entity performs corresponding processing according to the data packet identifier, and the processing method has been described in detail above, and will not repeat them here. It should be noted that, when the SM function entity does not find the session information related to the target UE, the SM function entity sends the third user plane configuration instruction to the DN side UP function entity through the packet-out (message delivery) to instruct that the DN side UP function entity configures a flow entry, for example, discarding the downlink data packet.

In an embodiment of the present disclosure, the MM function entity receives a connection release request sent by the access network entity, wherein the connection release request carries the identifier information of the UE, and the MM function entity sends the connection release request to the SM function entity according to the connection release request, and the user plane connection deactivation request is used to request the SM function entity to delete the user plane connection of the UE, and maintain the signaling plane connection of the UE. In this way, after the UE is in an idle state, the user plane between the UE and the core network is not maintained, but the signaling plane is still maintained, and the UP resource can be effectively saved.

Figure 6:
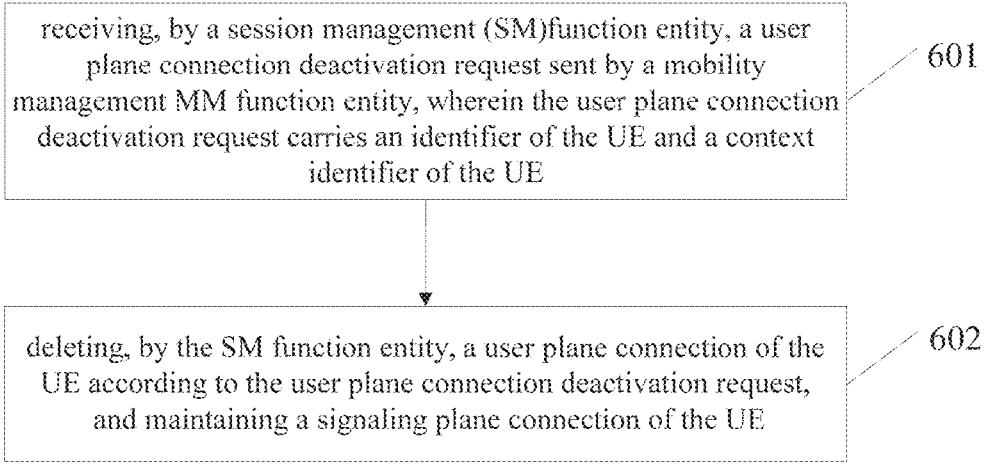
FIG. 6 is a schematic flowchart of another UE idle state processing method according to an embodiment of the present disclosure.

Referring to FIG. 6, FIG. 6 is a schematic flowchart of another UE, idle state processing method according to an embodiment of the present disclosure. As shown in FIG. 6, the method includes the following steps:

Step 601: The session management (SM) function entity receives the user plane connection deactivation request sent by the mobility management MM function entity, wherein the user plane connection deactivation request carries identifier information of the UE.

Step 602: The SM function entity deletes a user plane connection of the UE according to the user plane connection deactivation request, and maintains a signaling plane connection of the UE.

Optionally, the SM function entity deletes the user plane connection of the UE according to the user plane connection deactivation request, including:

The SM function entity sends a first user plane configuration instruction to the user plane UP function entity that serves the UE according to the user plane connection deactivation request, the first user plane configuration instruction is used to instruct that the UP function entity that serves the UE modifies the user plane configuration of the UE.

Optionally, the method further includes:

the SM function entity receives a user plane configuration completion message sent by the UP function entity;

the SM function entity sends a user plane connection deactivation completion message to the MM function entity according to the user plane configuration completion message.

Optionally, the UP function entity that serves the UE includes at least an access network (AN) side UP function entity and a data network (DN) side UP function entity, the first user plane configuration instruction is used to instruct the DN side UP function entity to modify the user plane of the UE, and is used to instruct that the UP function entity other than the DN side UP function entity on the UE user plane connection deletes the user plane connection with the UE.

Optionally, the method further includes:

the SM function entity receives a user plane connection activation request sent by the MM function entity;

the SM function entity selects a target UP function entity for the UE according to the user plane connection activation request and the session related information, wherein the target UP function entity is an UP function entity other than the DN side UP function entity;

The SM function entity sends a second user plane configuration instruction to the target UP function entity, the second user plane configuration instruction is used to instruct that the target UP function entity to establish a user plane connection with the UE, and is used to instruct the DN side UP function entity to modify the user plane of the UE.

Optionally, the session related information includes one or more of the following:

location information of the UE, service demand, node load, and congestion degree of the link.

Optionally, the method further includes:

the SM function entity receives data packet identifier information sent by the DN side UP function entity;

the SM function entity searches for the session information related to the target UE in the stored UE context according to the data packet identifier information;

If the session information related to the target UE is found, the SM function entity sends a downlink data packet report DDN to the MM function entity, the DDN is used to instruct the MM function entity to page the target UE;

If the session information related to the target UE is not found, the SM function entity sends a third user plane configuration instruction to the DN side UP function entity, the third user plane configuration instruction is used to instruct the DN side UP function entity to discard the data packet corresponding to the data packet identifier.

It should be noted that, in this embodiment, the SM function entity side embodiment corresponding to the embodiment shown in FIG. 1 to FIG. 5 may be used. The related steps performed by the SM function entity may be implemented as shown in FIG. 1 to FIG. 5. The relevant description in the example will not be repeated here.

Figure 7:
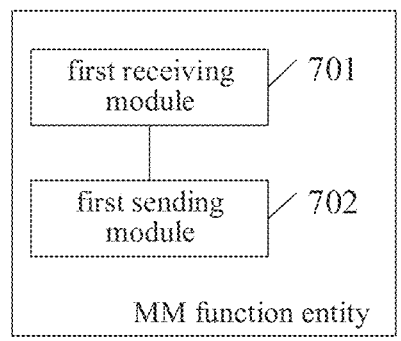
FIG. 7 is a schematic structural diagram of an MM function entity according to an embodiment of the present disclosure.

Referring to FIG. 7, FIG. 7 is a schematic structural diagram of an MM function entity according to an embodiment of the present disclosure. As shown in FIG. 7, the MM function entity includes:

a first receiving module 701 configured to receive a connection release request sent by the access network entity, wherein the connection release request carries identifier information of the user terminal UE;

a first sending module 702 configured to send a user plane connection deactivation request to the SM function entity according to the connection release request, the user plane connection deactivation request is used to request the SM function entity to delete the user plane connection of the UE and maintain a signaling plane connection of the UE.

Figure 8:
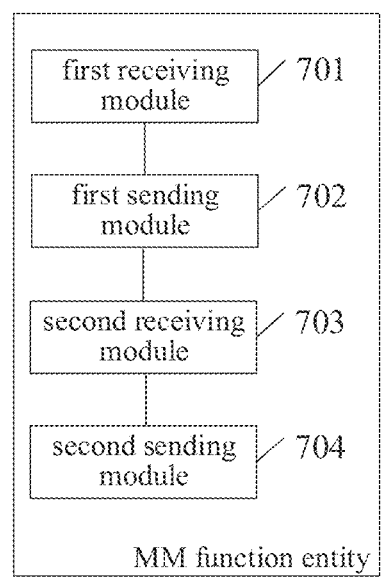
FIG. 8 is a schematic structural diagram of another MM function entity according to an embodiment of the present disclosure.

Optionally, referring to FIG. 8, FIG. 8 is a schematic structural diagram of another MM function entity according to an embodiment of the present disclosure. As shown in FIG. 8, the MM function entity further includes:

a second receiving module 703 configured to receive a user plane connection deactivation completion message sent by the SM function entity.

a second sending module 704 configured to send a connection release instruction to the access network entity according to the user plane connection deactivation completion message, the connection release instruction is used to instruct the access network entity to release a signaling plane connection and a user plane connection between the access network entity and the UE, and UE context information.

Figure 9:
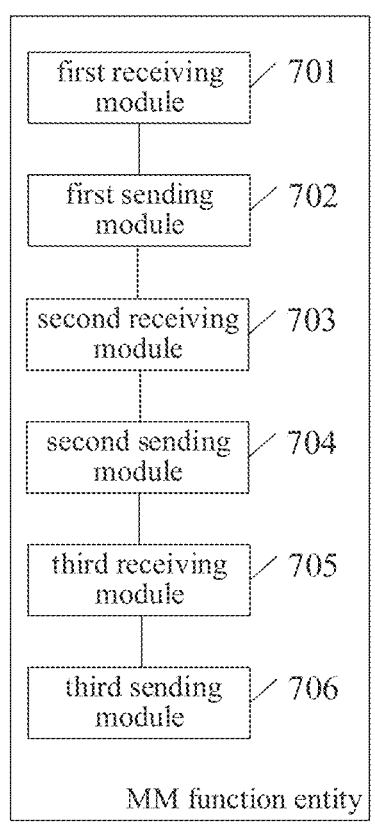
FIG. 9 is a schematic structural diagram of another MM function entity according to an embodiment of the present disclosure.

Optionally, referring to FIG. 9, FIG. 9 is a schematic structural diagram of another MM function entity according to an embodiment of the present disclosure. As shown in FIG. 9, the MM function entity further includes:

a third receiving module 705 configured to receive a service request message sent by the access network entity, wherein the service request message carries identifier information of the UE;

a third sending module 706 configured to send, according to the service request message, a connection establishment request message to the access network entity, the connection establishment request message is used to instruct the access network entity to establish a signaling plane connection and the user plane connection, and UE context information.

Figure 10:
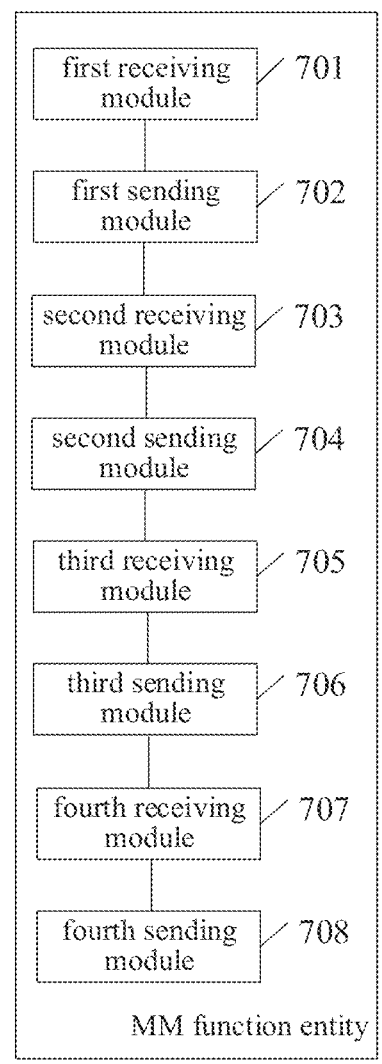
FIG. 10 is a schematic structural diagram of another MM function entity according to an embodiment of the present disclosure.

Optionally, referring to FIG. 10, FIG. 10 is a schematic structural diagram of another MM function entity according to an embodiment of the present disclosure. As shown in FIG. 10, the MM function entity further includes:

a fourth receiving module 707 configured to receive a connection establishment completion message sent by the access network entity.

a fourth module 708 configured to send a user plane connection activation request to the SM function entity according to the connection establishment completion message, the user plane connection activation request is used to request the SM function entity to create a user plane connection between a user plane UP function entity and the UE.

Figure 11:
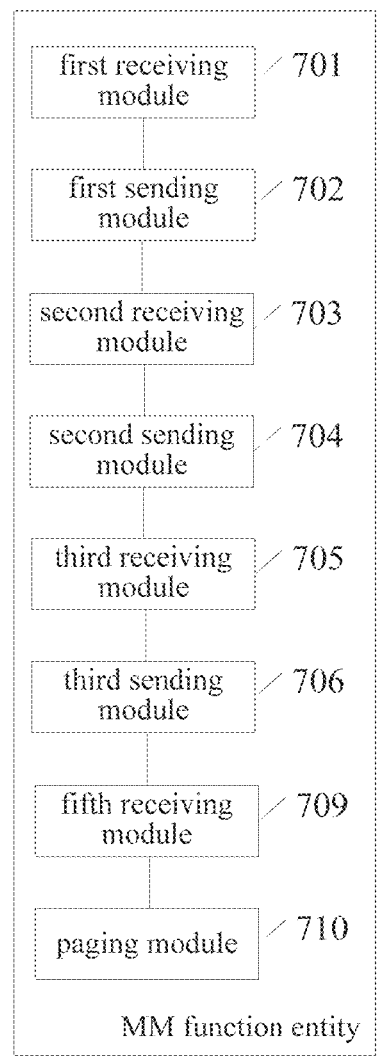
FIG. 11 is a schematic structural diagram of another MM function entity according to an embodiment of the present disclosure.

Optionally, referring to FIG. 11, FIG. 11 is a schematic structural diagram of another MM function entity according to an embodiment of the present disclosure. As shown in FIG. 11, the MM function entity further includes:

a fifth receiving module 709 configured to receive a downlink data packet report DDN sent by the SM function entity, wherein the DDN carries identifier information of the target UE.

a paging module 710 configured to page the target UE according to the DDN.

It should be noted that, in this embodiment, the MM function entity may be the MM function entity in the embodiment shown in FIG. 1 to FIG. 5, and any implementation manner of the MM function entity in the embodiment shown in FIG. 1 to FIGS. 1-5 is implemented by the above MM function entity in this embodiment, and achieves same beneficial effects, and details are not described herein again.

Figure 12:
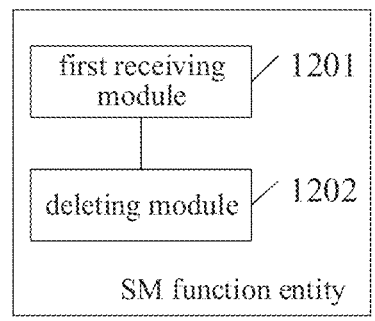
FIG. 12 is a schematic structural diagram of an SM function entity according to an embodiment of the present disclosure.

Referring to FIG. 12, FIG. 12 is a schematic structural diagram of an SM function entity according to an embodiment of the present disclosure. As shown in FIG. 2, the SM function entity includes:

a first receiving module 1201 configured to receive a user plane connection deactivation request sent by the mobility management MM function entity, wherein the user plane connection deactivation request carries identifier information of the UE;

a deleting module 1202 configured to delete the user plane connection of the UE according to the user plane connection deactivation request, and maintain a signaling plane connection of the UE.

Optionally, the deleting module 1202 is configured to send, according to the user plane connection deactivation request, the first user plane configuration instruction to the user plane UP function entity that serves the UE, the first user plane configuration instruction is used to instruct that the UP function entity that serves the UE to modify a user plane configuration of the UE.

Figure 13:
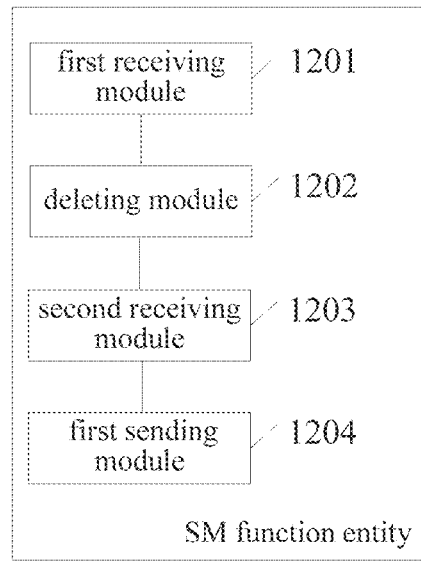
FIG. 13 is a schematic structural diagram of another SM function entity according to an embodiment of the present disclosure.

Optionally, referring to FIG. 13, FIG. 13 is a schematic structural diagram of another SM function entity according to an embodiment of the present disclosure. As shown in FIG. 13, the SM function entity further includes:

a second receiving module 1203 configured to receive a user plane configuration completion message sent by the UP function entity.

a first sending module 1204 configured to send a user plane connection deactivation completion message to the MM function entity according to the user plane configuration completion message.

Optionally, the UP function entity that serves the UE includes at least an access network AN side UP function entity and a data network DN side UP function entity, the first user plane configuration instruction is used to instruct the DN side UP function entity to modify the user plane of the UE, and is used to instruct that the UP function entity other than the side UP function entity on the UE user plane connection deletes the user plane connection with the UE.

Figure 14:
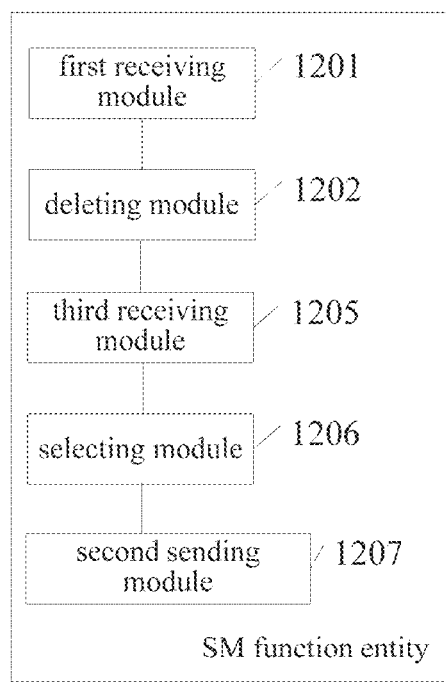
FIG. 14 is a schematic structural diagram of another SM function entity according to an embodiment of the present disclosure.

Optionally, referring to FIG. 14, FIG. 14 is a schematic structural diagram of an SM function entity according to an embodiment of the present disclosure. As shown in FIG. 14, the SM function entity further includes:

a third receiving module 1205 configured to receive a user plane connection activation request sent by the MM function entity;

a selecting module 1206 configured to select a target UP function entity for the UE according to the user plane connection activation request and the session related information, wherein the target UP function entity is an UP function entity other than the DN side UP function entity;

a second sending module 1207 configured to send a second user plane configuration instruction to the target UP function entity, the second user plane configuration instruction is used to instruct the target UP function entity to establish a user plane connection with the UE, and is used to instruct the DN side UP function entity to modify the user plane of the UE.

Optionally, the session related information includes one or more of the following: location information of the UE, service requirement, node load, and congestion degree of the link.

Figure 15:
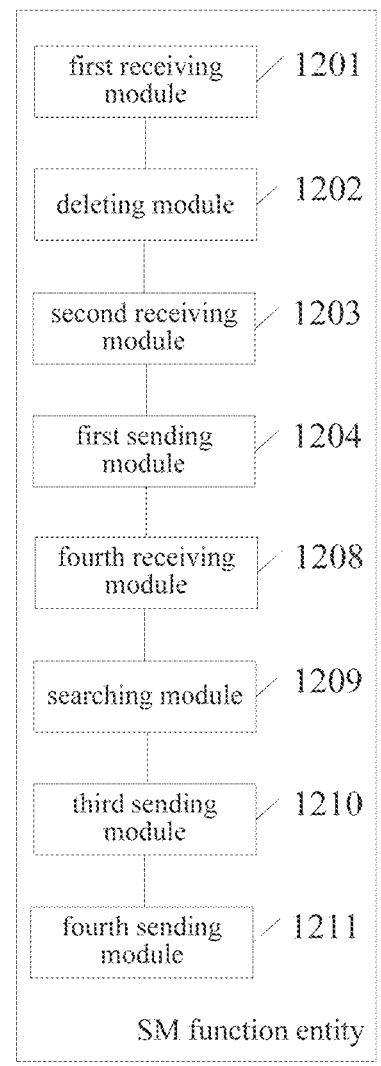
FIG. 15 is a schematic structural diagram of another SM function entity according to an embodiment of the present disclosure.

Optionally, referring to FIG. 15, FIG. 15 is a schematic structural diagram of an SM function entity according to an embodiment of the present disclosure. As shown in FIG. 15, the SM function entity further includes:

a fourth receiving module 1208 configured to receive data packet identifier information sent by the DN side UP function entity;

a searching module 1209 configured to search, according to the data packet identifier information, the session information related to the target UE from the stored UE context.

a third sending module 1210 configured to: if the session information related to the target UE is found, send a downlink data packet report DDN to the MM function entity, the DDN is used to instruct the MM function entity to page the Target UE;

a fourth sending module 1211 configured to send a third user plane configuration instruction to the DN side UP function entity if the session information related to the target UE is not found, the third user plane configuration instruction is used to instruct the DN side UP function entity to discard the data packet corresponding to the data packet identifier.

It should be noted that, in this embodiment, the SM function entity may be the SM function entity in the embodiment shown in FIG. 1 to FIG. 5, and any implementation manner of the SM function entity in the embodiment shown in FIG. 1 to FIGS. 1-5 is implemented by the above-mentioned SM function entity in this embodiment, and achieves same beneficial effects, and details are not described herein again.

Figure 16:
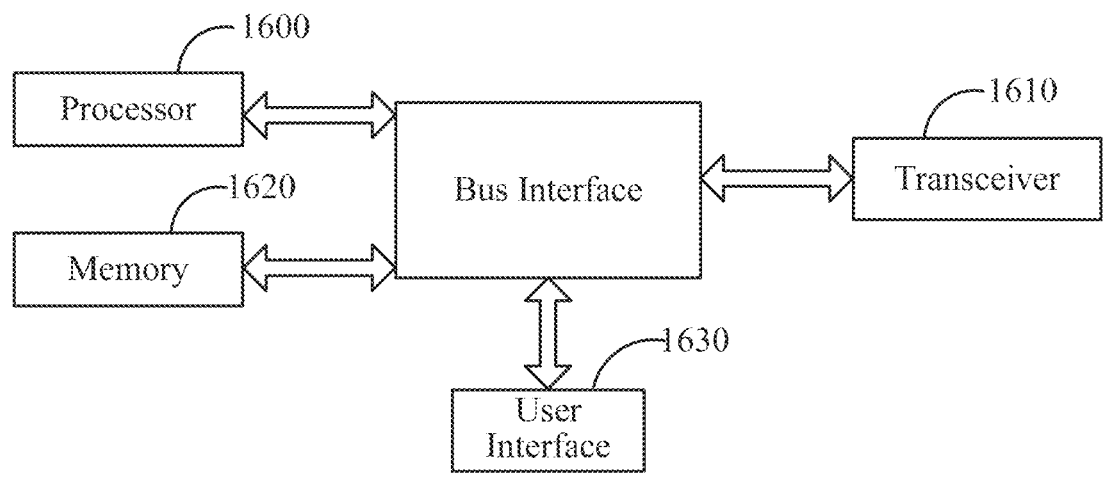
FIG. 16 is a schematic structural diagram of another MM function entity according to an embodiment of the present disclosure.

Referring to FIG. 16, FIG. 16 is a schematic structural diagram of an MM function entity according to an embodiment of the present disclosure. As shown in FIG. 16, the MM function entity includes: a processor 1600, a transceiver 1610, a memory 1620, a user interface 1630, and a bus interface, wherein:

The processor 1600 is configured to read a program in the memory 1620 and perform the following steps:

receiving a connection release request sent by the access network entity, wherein the connection release request carries identifier information of the UE;

sending, according to the connection release request, a user plane connection deactivation request to the SM function entity, the user plane connection deactivation request is used to request the SM function entity to delete the user plane connection of the UE, and maintain a signaling connection of the UE.

The transceiver 1610 is configured to receive and send data under the control of the processor 1600.

In FIG. 16, the bus architecture may include any number of interconnected buses and bridges, specifically linked by various circuits of one or more processors represented by processor 1600 and a memory represented by memory 1620. The bus architecture can also link various other circuits such as peripherals, voltage regulators, and power management circuits, which are well known in the art and, therefore, will not be further described herein. The bus interface provides an interface, the transceiver 1610 can be a plurality of components, including a transmitter and a receiver, providing means for communicating with various other devices on a transmission medium. For different user equipment, the user interface 1630 may also be an interface capable of externally connecting the required devices, including but not limited to a keypad, a display, a speaker, a microphone, a joystick, and the like.

The processor 1600 is responsible for managing the bus architecture and general processing, and the memory 1620 can store data used by the processor 1600 in performing operations.

Optionally, the processor 1600 is further configured to:

receiving a user plane connection deactivation completion message sent by the SM function entity;

sending a connection release instruction to the access network entity according to the user plane connection deactivation completion message, the connection release instruction is used to instruct the access network entity to release a signaling plane connection and user plane connection between the access network entity and the UE, and UE context information.

Optionally, the processor 1600 is further configured to:

receiving a service request message sent by the access network entity, where the service request message carries identifier information of the UE;

sending a connection establishment request message to the access network entity according to the service request message, the connection establishment request message is used to instruct the access network entity to establish a signaling plane connection and a user plane connections between the access network entity and the UE, and UE context information.

Optionally, the processor 1600 is further configured to:

receiving a connection establishment completion message sent by the access network entity;

sending a user plane connection activation request to the SM function entity according to the connection establishment completion message, the user plane connection activation request message is used to request the SM function entity to create a user plane connection between a user plane UP function entity and the UE.

Optionally, the processor 1600 is further configured to:

receive a downlink data packet report DDN by the SM function entity, wherein the DDN carries identifier information of the target UE;

page the target UE according to the DDN.

It should be noted that, in this embodiment, the MM function entity may be the MM function entity in the embodiment shown in FIGS. 1-5, and any implementation manner of the MM function entity in the embodiment shown in FIG. 1 to FIGS. 1-5 is implemented by the above MM function entity in this embodiment, and achieves same beneficial effects, and details are not described herein again.

Figure 17:
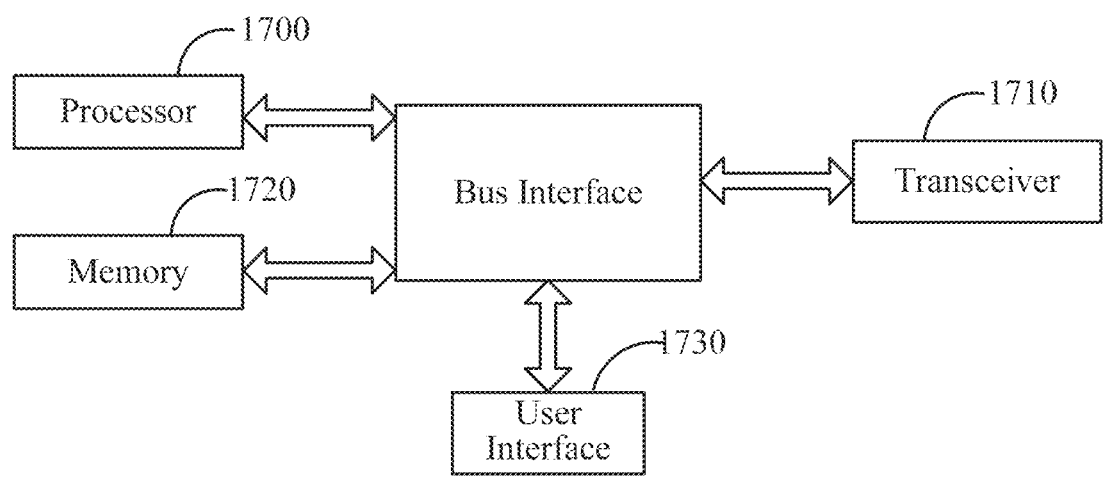
FIG. 17 is a schematic structural diagram of another SM function entity according to an embodiment of the present disclosure.

Referring to FIG. 17, FIG. 17 is a schematic structural diagram of an SM function entity according to an embodiment of the present disclosure. As shown in FIG. 17, the SM function entity includes: a processor 1700, a transceiver 1710, a memory 1720, a user interface 1730, and a bus interface, wherein:

The processor 1700 is configured to read a program in the memory 1720 and perform the following steps:

receiving a user plane connection deactivation request sent by the mobility management MM function entity, wherein the user plane connection deactivation request carries the identifier information of the UE;

deleting the user plane connection of the UE according to the user plane connection deactivation request, and maintaining a signaling plane connection of the UE.

The transceiver 1710 is configured to receive and send data under control of the processor 1700.

In FIG. 17, the bus architecture may include any number of interconnected buses and bridges, specifically linked by various circuits of one or more processors represented by processor 1700 and memory represented by memory 1720. The bus architecture can also link various other circuits such as peripherals, voltage regulators, and power management circuits, which are well known in the art and, therefore, will not be further described herein. The bus interface provides an interface. The transceiver 1710 can be a plurality of components, including a transmitter and a receiver, providing means for communicating with various other devices on a transmission medium. For different user equipment, the user interface 1730 may also be an interface capable of externally connecting the required devices, including but not limited to a keypad, a display, a speaker, a microphone, a joystick, and the like.

The processor 1700 is responsible for managing the bus architecture and general processing, and the memory 1720 can store data used by the processor 1700 in performing operations.

Optionally, the processor 1700 deletes the user plane connection of the UE according to the user plane connection deactivation request, including:

sending, according to the user plane connection deactivation request, a first user plane configuration instruction to a user plane UP function entity that serves the UE, the first user plane configuration instruction is used to instruct the UP function entity serving the UE to modify the user plane configuration of the UE.

Optionally, the processor 1700 is further configured to:

receive a user plane configuration completion message sent by the UP function entity;

send a user plane connection deactivation completion message to the MM function entity according to the user plane configuration completion message.

Optionally, the UP function entity that serves the UE includes at least an access network AN side UP function entity and a data network DN side UP function entity, the first user plane configuration instruction is used to instruct the DN side UP function entity to modify the user plane of the UE, and is used to instruct the UP function entity other than the DN side UP function entity on the UE user plane connection to delete the user plane connection with the UE.

Optionally, the processor 1700 is further configured to:

receive a user plane connection activation request sent by the MM function entity;

select a target UP function entity for the UE according to the user plane connection activation request and the session related information, wherein the target UP function entity is an UP function entity other than the DN side UP function entity;

send a second user plane configuration instruction to the target UP function entity, the second user plane configuration instruction is used to instruct the target UP function entity to establish a user plane connection with the UE, and is used to instruct the DN side The UP function entity to modify the user plane of the UE.

Optionally, the session related information includes one or more of the following:

location information of the UE, service demand, node load, and congestion degree of the link.

Optionally, the processor 1700 is further configured to:

receive data packet identifier information sent by the DN side UP function entity, search, according to the data packet identifier information, session information related to the UE in a stored UE context;

If the session information related to the target UE is found, sending a downlink data packet report DDN to the MM function entity, the DDN is used to instruct the MM function entity to page the target UE;

If the session information related to the target UE is not found, sending the third user plane configuration instruction to the DN side UP function entity, the third user plane configuration instruction is used to instruct the DN side UP function entity to discards data packet corresponding to the data packet identifier.

It should be noted that, in this embodiment, the SM function entity may be the SM function entity in the embodiment shown in FIGS. 1-5, and any implementation manner of the SM function entity in the embodiment shown in FIG.

1 to FIGS. 1-5 is implemented by the above-mentioned SM function entity in this embodiment, and achieves same beneficial effects, and details are not described herein again.

In the several embodiments provided in the present application, it should be understood that the disclosed method and apparatus may be implemented in other manners. For example, the device embodiments described above are merely illustrative. For example, the division of the unit is only a logical function division. In actual implementation, there may be another division manner, for example, multiple units or components may be combined or may be integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

In addition, each functional unit in various embodiments of the present disclosure may be integrated into one processing unit, or each unit may be physically included separately, or two or more units may be integrated into one unit. The above integrated unit can be implemented in the form of hardware or in the form of hardware plus software functional units.

The above-described integrated unit implemented in the form of a software functional unit can be stored in a computer readable storage medium. The above software functional unit is stored in a storage medium and includes a plurality of instructions for causing a computer device (which may be a personal computer, a server, or a network device, etc.) to perform part of the steps of the receiving and sending method of the various embodiments of the present disclosure. The foregoing storage medium includes: a U disk, a mobile hard disk, a read-only memory (ROM), a random access memory (RAM), a magnetic disk, or an optical disk, and the like, and the program code can be stored. Medium.

The above is an optional embodiment of the present disclosure. It should be noted that those of ordinary skill in the art may make various improvements and modifications without departing from the principle of the present disclosure, and these improvements and modifications shall be considered to fall into the protection scope of the present disclosure.

What is claimed is:

1. A method of processing user terminal (UE) idle state, comprising:
    receiving, by a mobility management (MM) function entity, a connection release request sent by an access network entity, wherein the connection release request carries identity information of the UE;
    sending, by the MM function entity, a user plane connection deactivation request to a session management (SM) function entity according to the connection release request, the user plane connection deactivation request is used to request the SM function entity to delete a user plane connection of the UE, and maintain a signaling plane connection of the UE;
    wherein the method further comprises:
    receiving, by the MM function entity, a user plane connection deactivation completion message sent by the SM function entity;
    sending, by the MM function entity, a connection release instruction to the access network entity according to the user plane connection deactivation completion message, the connection release instruction is used to instruct the access network entity to release a signaling plane connection and a user plane connection between the access network entity and the UE, and UE context information; and
    receiving, by the MM function entity, a service request message sent by the access network entity, wherein the service request message carries the identity information of the UE;
    sending, by the MM function entity, a connection establishment request message to the access network entity according to the service request message, the connection establishment request message is used to instruct the access network entity to establish a signaling plane connection and a user plane connection between the access network entity and the UE, and UE context information.

2. The method according to claim 1 further comprising:
    receiving, by the MM function entity, a connection establishment completion message sent by the access network entity;
    sending, by the MM function entity, a user plane connection activation request to the SM function entity according to the connection establishment completion message, the user plane connection activation request message is used to request the SM function entity to create a user plane connection of the UE.

3. The method according to claim 1, further comprising:
    receiving, by the MM function entity, a downlink data packet report (DDN) sent by the SM function entity, where the DDN carries an identifier information of a target UE;
    paging, by the MM function entity, the target UE according to the DDN.

4. A mobility management (MM) function entity, comprising: a processor, a transceiver, a memory, a user interface, and a bus interface, wherein the processor is configured to read a program in the memory to perform the method of processing UE idle state as claimed in claim 1, the transceiver is configured to receive and send data under control of the processor.

5. The MM function entity of claim 4, wherein the processor is further configured to perform:
    receiving a user plane connection deactivation completion message sent by a session management (SM) function entity;
    sending a connection release instruction to the access network entity according to the user plane connection deactivation completion message, the connection release instruction is used to instruct the access network entity to release a signaling plane connection and a user plane connection between the access network entity and the UE, and UE context information.

6. The MM function entity of claim 5, wherein the processor is further configured to perform:
    receiving a service request message sent by the access network entity, wherein the service request message carries the identity information of the UE;
    sending a connection establishment request message to the access network entity according to the service request message, the connection establishment request message is used to instruct the access network entity to establish a signaling plane connection and a user plane connection between the access network entity and the UE, and UE context information;
    receiving, by the MINI function entity, a connection establishment completion message sent by the access network entity.

7. The MM function entity of claim 6, wherein the processor is further configured to perform:
receiving a connection establishment completion message sent by the access network entity; and
sending a user plane connection activation request to the SM function entity according to the connection establishment completion message, the user plane connection activation request message is used to request the SM function entity to create a user plane connection of the UE.

8. A method of processing user terminal (UE) idle state, comprising:
receiving, by a session management (SM) function entity, a user plane connection deactivation request sent by a mobility management (MM) function entity, wherein the user plane connection deactivation request carries identity information of the UE;
deleting, by the SM function entity, a user plane connection of the UE according to the user plane connection deactivation request, and maintains a signaling plane connection of the UE;
wherein the SM function entity deletes the user plane connection of the UE according to the user plane connection deactivation request, comprising:
sending, by the SM function entity, a first user plane configuration instruction to the user plane (UP) function entity that serves the UE according to the user plane connection deactivation request, the first user plane configuration instruction is used to instruct the UP function entity that serves the UE to modify a user plane configuration of the UE;
wherein the UP function entity that serves the UE comprises at least an access network (AN) side UP function entity and a data network (DN) side UP function entity, the first user plane configuration instruction is used to instruct the DN side UP function entity to modify a user plane of the UE, and is used to instruct UP function entities other than the DN side UP function entity on the UE user plane connection to delete a user plane connection of the UE.

9. The method according to claim 8, further comprising:
receiving, by the SM function entity, a user plane configuration completion message sent by the UP function entity;
sending, by the SM function entity, a user plane connection deactivation completion message to the MM function entity according to the user plane configuration completion message.

10. The method according to claim 8 further comprising:
receiving, by the SM function entity, a user plane connection activation request sent by the MM function entity;
selecting, by the SM function entity, a target UP function entity for the UE according to the user plane connection activation request and session related information, wherein the target UP function entity is an UP function entity other than the DN side UP function entity;
sending, by the SM function entity, a second user plane configuration instruction to the target UP function entity, the second user plane configuration instruction is used to instruct the target UP function entity to establish a user plane connection with the UE, and is used to instruct the DN side UP function entity to modify the user plane of the UE.

11. The method according to claim 10, wherein the session related information comprises at least one of the following:
location information of UE, service requirements, node load, and congestion level of a link.

12. The method according to claim 8, further comprising:
receiving, by the SM function entity, data packet identifier information sent by the DN side UP function entity;
searching, by the SM function entity, the session information related to the target UE in the stored UE context according to the data packet identifier information;
if the session information related to the target UE is found, the SM function entity sends a downlink data packet report (DDN) to the MM function entity;
if the session information related to the target UE is not found, the SM function entity sends a third user plane configuration instruction to the DN side UP function entity, the third user plane configuration instruction is used to instruct the DN side UP function entity to discard data packet corresponding to the data packet identifier.

13. A session management (SM) function entity, comprising: a processor, a transceiver, a memory, a user interface, and a bus interface, wherein the processor is configured to read a program in the memory to perform the method of processing UE idle state as claimed in claim 8, wherein the transceiver is configured to receive and send data under control of the processor.

14. The SM function entity of claim 13, wherein the processor is further configured to perform:
sending a first user plane configuration instruction to the user plane (UP) function entity that serves the UE according to the user plane connection deactivation request, the first user plane configuration instruction is used to instruct the UP function entity that serves the UE to modify a user plane configuration of the UE.

15. The SM function entity of claim 14, wherein the processor is further configured to perform:
receiving a user plane configuration completion message sent by the UP function entity;
sending a user plane connection deactivation completion message to the MM function entity according to the user plane configuration completion message.

16. The SM function entity of claim 13, wherein the processor is further configured to perform:
receiving a user plane connection activation request sent by the MM function entity;
selecting a target UP function entity for the UE according to the user plane connection activation request and session related information, wherein the target UP function entity is an UP function entity other than the DN side UP function entity; and
sending a second user plane configuration instruction to the target UP function entity, the second user plane configuration instruction is used to instruct the target UP function entity to establish a user plane connection with the UE, and is used to instruct the DN side UP function entity to modify the user plane of the UE.

* * * * *